United States Patent

[11] 3,621,206

| [72] | Inventor | Albert W. Scribner<br>Darien, Conn. |
|---|---|---|
| [21] | Appl. No. | 852,016 |
| [22] | Filed | Aug. 21, 1969 |
| [45] | Patented | Nov. 16, 1971 |
| [73] | Assignee | Pitney-Bowes, Inc.<br>Stamford, Conn. |

[54] LABEL-ALIGNING SYSTEM
17 Claims, 5 Drawing Figs.

[52] U.S. Cl. ................................................. 235/61.11 E,
235/61.12 N
[51] Int. Cl. ................................................. G06k 7/10,
G06k 19/04
[50] Field of Search ........................................ 235/61.11,
61.113, 61.115; 250/219

[56] References Cited
UNITED STATES PATENTS
2,842,312 7/1958 Weeks .......................... 235/61.11 C

| 3,066,863 | 12/1962 | Wilson .......................... | 235/61.11 |
| 3,221,146 | 11/1965 | Dreyer et al. ................. | 235/61.11 C |
| 3,312,372 | 4/1967 | Cooper, Jr. ................... | 235/61.11 X |
| 3,418,456 | 12/1968 | Hamisch et al. ............... | 235/61.11 E |
| 3,484,588 | 12/1969 | Parks et al. .................. | 235/61.11 E |

*Primary Examiner*—Daryl W. Cook
*Attorneys*—William D. Soltow, Jr. and Martin D. Wittstein ABSTRACT: In a data-reading system of the type which includes a label and a reading device which must be aligned with that label, the aligning function is performed by a plurality of locating surfaces on the label and a cooperating pair of locating surfaces on the reading device, at least one of the locating surfaces on the label being eccentric relative to the circular data field of the label so that the reading device is oriented angularly as well as linearly.

PATENTED NOV 16 1971

INVENTOR.
ALBERT W. SCRIBNER
BY Martin P. Wittstein
ATTORNEY

INVENTOR.
ALBERT W. SCRIBNER
BY Martin P. Wittstein
ATTORNEY

INVENTOR.
ALBERT W. SCRIBNER
ATTORNEY ered with a cash register or other calculating device so as to compute the
LABEL-ALIGNING SYSTEM

FIELD OF THE INVENTION

This invention relates generally to automatic electronic data-gathering systems, and particularly concerns rotary scanning of a circular data field upon a merchandise label for retail store applications.

THE PRIOR ART

The present invention is an improvement on the type of information gathering system in La Mers U.S. Pat. No. 3,413,447. The patent discloses a data system particularly adapted for retail selling applications, in which various articles of merchandise are provided with tags bearing information as to the retail price of the goods, as well as information useful for inventory control purposes. A label-reading device is used at the checkout counter, and is operatively connected to a cash register or other calculating device so as to compute the total sale price of all articles selected by the customer, and to gather inventory control statistics. The reader is a hand-size device having a rotary scanning head and a circular locating pin which is oriented concentrically with the axis of scanner rotation. The merchandise labels have the required informed imprinted thereon in the form of appropriate indicia arranged in a circular data field. At the center of this field is a circular locating hole which mates with the circular locating pin of the reading device in order to establish a coaxial relationship between the scanner and the data field during the rotary scan cycle.

The single concentric circular locating hole and matching locating pin of the La Mers system has the advantage that only one such locating hole and locating pin, both having the simplest of geometric shapes, are required to establish to the proper position of the scanning head relative to the data field, so far as linear coordinates are concerned, However, a price is paid for such simplicity of construction, in that the La Mers locating system is unable to align the rotary scanner with the label in an angular sense. As a result, there is no way of knowing in advance the initial angular position of the scanner relative to the data field. The scanner may start at random at any angular location between the start and finish of the circular field. Therefore there is no way to prevent the last part of a data sequence from being scanned before the initial portion of the sequence.

Consequently, additional complications must be introduced into the electronic interpretation equipment which receives the message read by the scanning head. For example, additional circuitry may be required for making sense out of the disarranged sequence of received data pulses. Alternatively, as in the La Mers device, some provision must be made for waiting through a tail end cycle of rotation of the scanning head (until the start position is reached), sensing the start position, and then turning on the data interpretation circuitry.

In addition to the added circuit complexity, this approach extends the overall label reading time by the amount of time required to reach the start position; averaging a 50 percent increase over a large number of reading cycles. In the context of a busy checkout counter, the cumulative lost time can be significant.

THE INVENTION

The present invention provides improved means for aligning a label and reading device means which are almost as simple as those of La Mers, but which have the added advantage of providing a fixed angular orientation of the scanning head relative to the circular data field. By virtue of this fixed angular position, the data interpretation circuitry can be simplified considerably, since the scanning head will always start at the zero angular position of the data field. Moreover, no time need be wasted to allow the scanner head to traverse idly toward that position.

The invention contemplates a data reading system in which the locating means comprise a plurality of locating surfaces formed on the label and oriented transversely to the data-bearing surface thereof, and another plurality of locating surfaces formed on the reading device. At last a first one of the label-locating surfaces is arranged to engage at least a first one of the device-locating surfaces in a manner to position the rotary scanner relative to the data field with respect to at least one linear coordinate. Finally, at least a second one of the label-locating surfaces is arranged to engage at least a second one of the device-locating surfaces, and these second locating surfaces are arranged eccentrically relative to the data field and the scanning head respectively, in a manner to orient the scanning head relative to the data field with respect to an angular coordinate about the axis of concentricity of the circular data field.

The label-locating surfaces may be the outer edges of the label, or the edges of variously shaped notches or holes formed in the label, e.g. circular, triangular or rectangular, with corresponding variations of the mating surfaces of the reading device; so long as the basic concept is preserved of having at least one set of cooperating locating surfaces in eccentric relationship to the circular data field so as to provide a reference from which to derive a fixed angular location of the rotary scanner relative to the data field.

DETAILED DESCRIPTION OF THE PREFERRED EMBODIMENTS

In the embodiment of FIGS. 1 through 4, the locating surfaces on the label are the sides of variously shaped openings formed in the material of the label. (The word "opening" here and in the appended claims is used in its broad sense to include both a notch which communicates with the outer edge of the label, and an interior hole which does not communicate with the outer edge). In contrast, the embodiment of FIG. 5 uses the outer edges of the label itself as locating surfaces, thus avoiding the need for openings of any kind in the material of the label.

Figure 1:
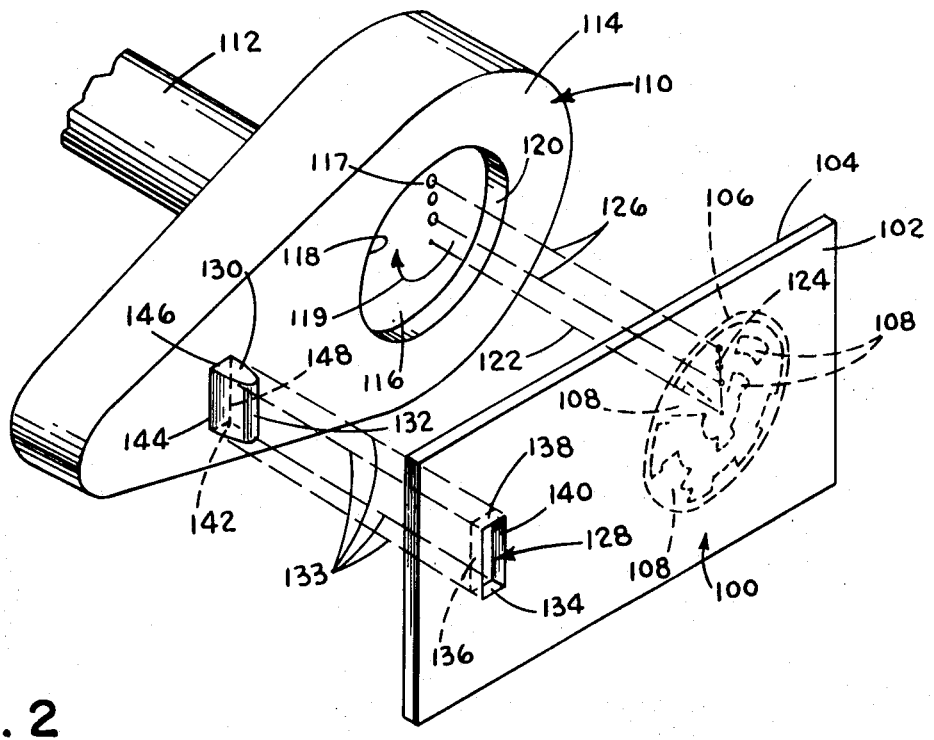
FIG. 1 is a perspective view of an information-bearing label and a cooperating reading device in accordance with this invention.

Turning first to those embodiments in which the locating surfaces are defined by openings, i.e. notches or holes, formed in the label material, we focus our attention initially upon FIG. 1. This illustrates a label 100 having a rear surface 102 and a front surface 104. Upon the latter surface there appears a circular data field 106 within which are distributed various data indicia 108 arranged selectively so as to represent price and/or inventory control information according to some predetermined coding scheme. As in the La Mers system, the data indicia 108 may be areas which contrast in color to the label surface 104, so as to be readable by photoelectric means.

A label-reading device 110 mounted at the end of a handle 112 has a front surface 114 which is adapted to overlie the front surface 104 of label 100, and photoelectric scanning head 116 which is adapted to read the indicia 108. The scanning head 116 is preferably a photoelectric device of the type fully disclosed in the La Mers patent (cited above), which includes a plurality of scanning elements 117. Each scanning element includes an illuminating source to direct light against the data indicia 108, and a photocell to detect reflections from these indicia. The scanner 116 operates through a circular window 118, and is rotated in the direction of arrow 119 during its label-scanning cycle by means of an appropriate drive mechanism incorporated in the reading device 110. In order to provide an illuminated space between the rotary scanner 116 and the data-bearing label surface 104 during the reading operation, the scanner 116 is recessed from the surface 114 by the width of a small shoulder 120 at the perimeter of circular window 118.

During the reading operation it is essential that the rotary scanner head 116 be aligned concentrically with the circular data field 106, i.e. that the center of the circular scanner 116 be aligned with the axis of concentricity 122 of the circular data field 106. Moreover, in accordance with the present invention, the scanning elements 117 should be angularly aligned, as indicated by the dashed lines 126, with a starting location designated 124 on the data field 106. In order to accomplish this, the material of the label 100 may be cut out to form an oblong locating hole 128 which extends entirely through the label from its front surface 104 to its rear surface 102. A corresponding locating prong 130 projects from the surface 114 of reading device 110, and has an oblong shape at the base thereof (where it joins the surface 114) which is substantially congruent with the hole 128. As a result, prong 130 may be inserted into the locating hole 128 (as shown by dashed lines 133) to lock the label 100 into a fixed attitude and position relative to the reading device 110. The outer tip 132 of prong 130 need not be congruent with the locating hole 128, and in fact is preferably tapered to permit easier insertion into the locating hole.

The sides of oblong locating hole 128 in effect comprise four distinct locating surfaces 134, 136, 138 and 140 which mate with four corresponding locating surfaces 142, 144, 146 and 148 respectively forming the four sides of the oblong locating prong 130. A particular pair of mating surfaces, such as surface 136 on the label 100 and surface 144 on the reading device 110, are located equal distances from the centers of the data field 106 and the rotary scanning head 116 respectively so as to establish a fixed location for the rotary scanning head 116 relative to the data field 106 along a particular linear coordinate, i.e. along the horizontal direction as seen in FIG. 1. The surfaces 140 and 148 also perform this function, and in a similar manner the pairs of mating surfaces 146, 138 and 142, 134 perform the same function for the linear coordinate which is oriented vertically as seen in FIG. 1. As a result, the center of rotary scanner 116 is lined up with the axis of concentricity 122 of the data field 106 when the reading head 110 is placed over the label 100 and the locating prong 130 is inserted into the locating hole 128.

But in addition, any pair of mating locating surfaces, by virtue of the fact that they are eccentric relative to the circular data field 106 and rotary scanner 116, provide a reference by which a definite angular relationship is established. The term "eccentric" is used here and in the appended claims in the sense or any surface is eccentric, relative to a particular center or axis, if that surface is either noncircular, or is circular but has a different center or axis of concentricity. It will be apparent that planar surfaces 134 through 140 which form the boundaries of the locating hole 128 are eccentric relative to the data field 106 in the sense that they are not circular. Similarly the four planar locating surfaces 142 through 148 of the locating prong 130 are eccentric relative to the circular scanning head 116. This permits the mating locating surfaces to fix the attitude of the scanning head 116 so that the reading device 110 always lines up in the same angular position relative to the starting line 124 of the data field 106. Then, if reading device 110 is designed so that the scanning head 116 always finishes its rotary scanning cycle in the same angular position, i.e. upright as seen in FIG. 1, the scanning elements 117 thereof will always start out in alignment with the starting line 124. In order to disturb that fixed angular relationship, it would be necessary to twist the oblong locating prong 130 within the oblong locating hole 128, which is not possible without stressing the materials of the label 100 and reading device 110 beyond the limits of their structural strength.

Figure 2:
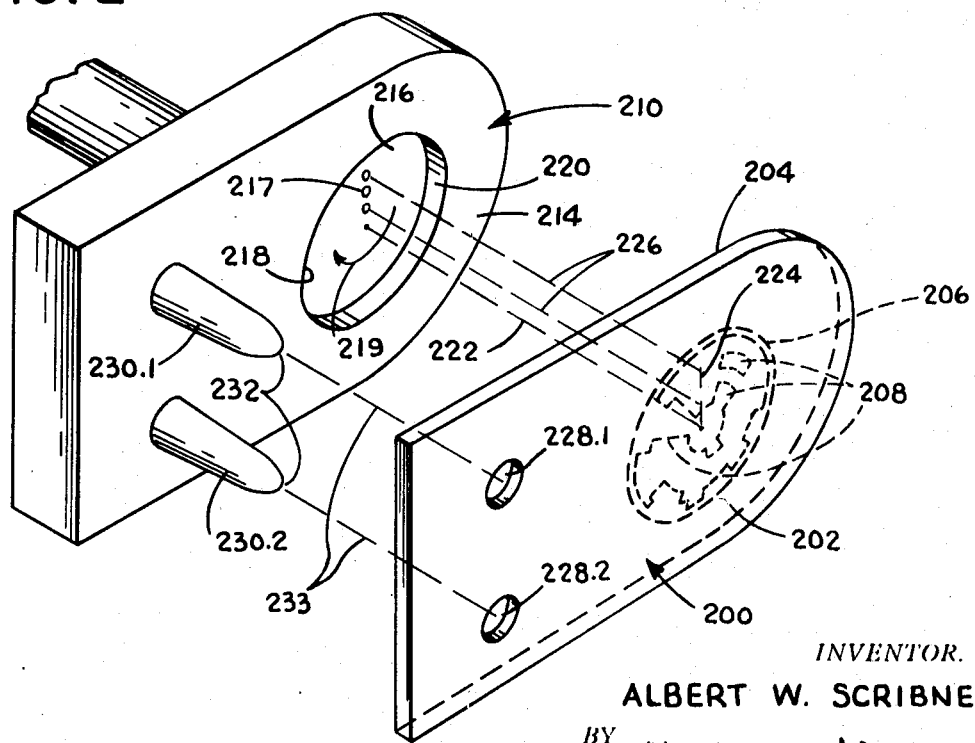
FIG. 2 is a perspective view of an alternative embodiment of an information-bearing label and cooperating reading device in accordance with this invention.

The alternative embodiment of FIG. 2 is quite similar to that of FIG. 1, a fact which is emphasized by the use of reference numerals which match except for their most significant digit. Thus there is a label 200 having a rear surface 202, and a front surface 204 upon which appears a circular data field 206 with photoelectrically readable data indicia 208. A reading device 210 mounted upon a handle 212 has a front surface 214 in which is set a rotary photoelectric scanner 216 of the type discussed above. A radial line of elements 217 is included in the scanning head 216, which turns in the direction indicated by arrow 219 under the influence of a suitable drive unit incorporated within the reading device 210. Once again the scanner is operable through a circular window 218, and is recessed from the surface 214 by the width of a shoulder 220 which forms the boundary of the window 218.

In order to line up the center of the rotary scanning head 216 with the axis of concentricity 222 of the circular data field 206, and also to fix the angular position of the elements 217 so that they line up with the starting position 224, the label 200 is provided with two separate locating holes 128.1 and 128.2, and the reading device 210 is provided a mating pair of locating pins 230.1 and 230.2 respectively. The internal and external surfaces of the holes and prongs respectively are the mating locating surfaces. In this instance the cross-sectional shape of the locating holes and the locating pins is circular, yet the locating surfaces are nevertheless eccentric so far as the data field 206 and rotary scanner 216 are concerned, since the holes and prongs do not share a common center or axis of concentricity therewith. Once again, it is preferable if the locating pins 230.1 and 230.3 are somewhat tapered toward their tips 232 in order to facilitate insertion of the prongs into the locating holes.

Once again it will be appreciated that the spacing of the locating holes 128.1 and 128.2 along linear $x$ and $y$ coordinates relative to the center of the data field 206, and the spacing of the prongs 230.1 and 230.2 along $x$ and $y$ coordinates relative to the center of the circular scanner 216, fixes the linear coordinate position of the scanner relative to the data field, so that the center of the scanner lines up with the data field axis of concentricity 222. In addition, the two locating holes and their cooperating prongs cooperate so that the angular position of the scanner 216 is also fixed relative to the data field 206. If only one circular hole 128.1 or 128.2 and one circular pin 230.1 or 230.2 were employed, the reading device 210 could rotate freely relative to the label 200. But with a pair of locating holes employed as shown, neither locating pin can rotate within its own hole without displacing the other pin. Accordingly, the arrangement of FIG. 2 also achieves a fixed angular orientation.

For maximum compatibility with existing equipment of the La Mers type, one of the holes 228 and prongs 230 may be placed concentrically with the data field 206 and scanner 216, without sacrificing the advantages of fixed angular position.

Figure 3:
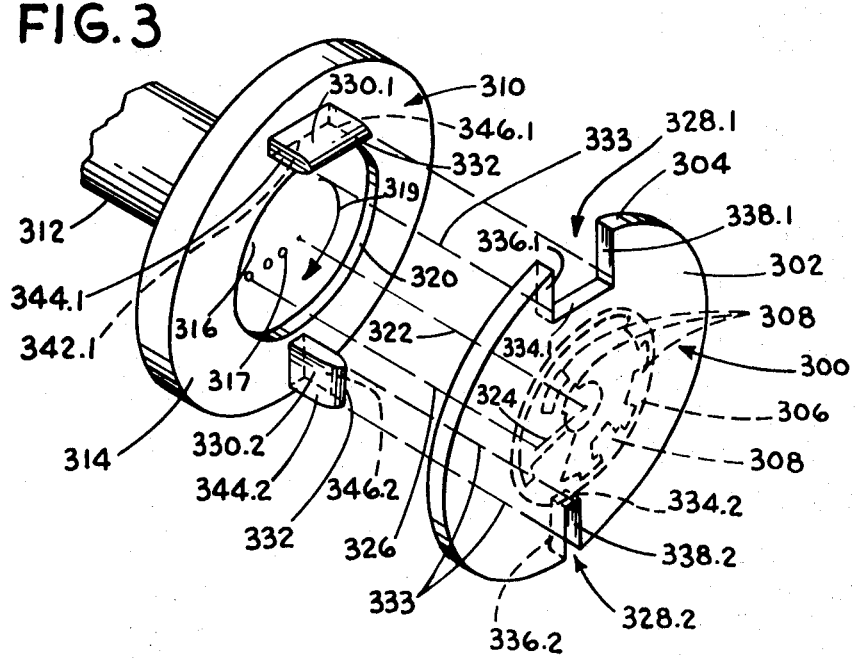
FIG. 3 is another alternative embodiment of an information-bearing label and a cooperating reading device in accordance with this invention.
Figure 4:
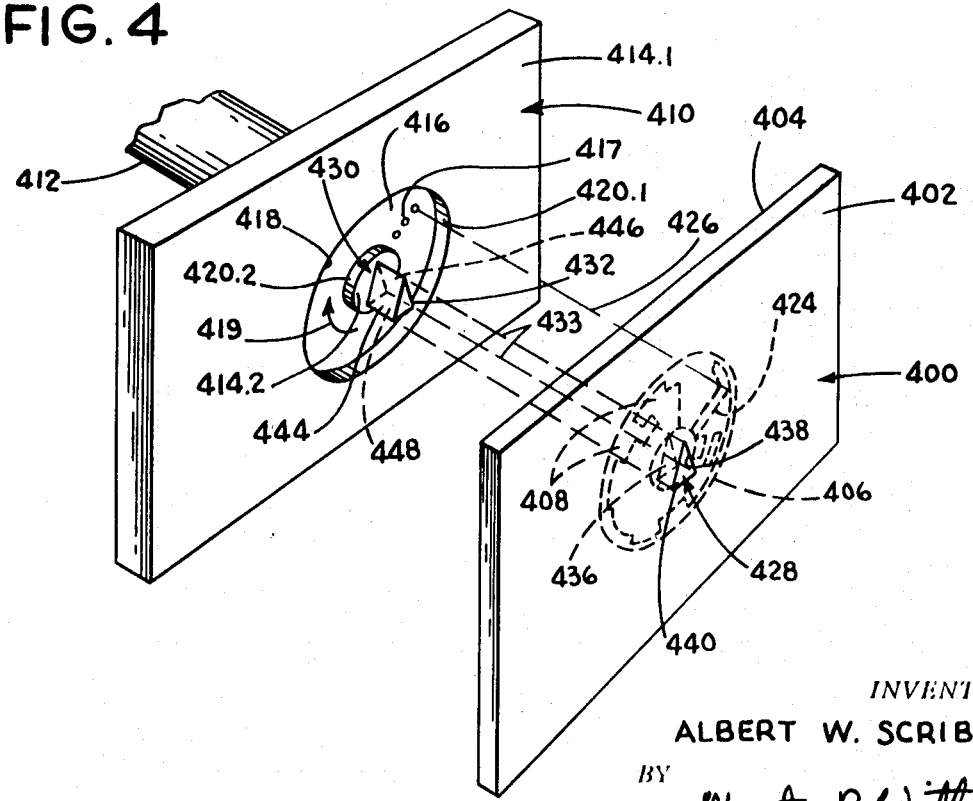
FIG. 4 is a further alternative embodiment of an information-bearing label and cooperating reading device in accordance with this invention.

In the alternative embodiment of FIG. 3 the label 300 and reading device 310 are again similar to those previously described, as indicated by the use of reference numerals which match those of the preceding figures, except for their most significant digit. In this instance it will be readily seen that the locating openings 328.1 and 328.2 are in the form of notches which communicate with the outer edge of label 300. The locating notch 328.1 comprises three locating surfaces 334.1, 336.1, and 338.1 which cooperate with locating surfaces 342.1, 344.1, 336.1, and 346.1 respectively of an oblong locating pin 330.1 upon the reading device 310. Similarly, the other locating hole 328.2 on the label 300 comprises locating surfaces 334.2, 336.2 and 338.2 which cooperate with locating surfaces 342.2, 344.2 and 346.2 of another oblong locating pin 330.2 on the reading device 310.

These cooperating locating surfaces, all of which are planar and therefore are eccentric relative to the circular data field 306 and the circular scanning head 316, serve to establish fixed linear coordinates for lining up the center of the scanning head 316 with the axis of concentricity 322 of the circular data field 306, and they also establish a fixed angular orientation so that the scanning elements 317 line up with the starting position 324. In this embodiment the locating notch 328.1 and its cooperating prong 330.1 are elongated in the horizontal direction so as to be primarily responsible for establishing the vertical linear coordinate of position, which the other locating notch 328.2 and its cooperating prong 330.2 are elongated in the vertical direction so as to be primarily responsible for establishing the horizontal linear coordinate of position, while all pairs of mating surfaces cooperate in establishing the desired angular orientation.

In the alternative embodiment of FIG. 4 once again the arrangement is almost identical to that of the preceding embodiments, and the similarity is reflected in the use of reference numerals which match those of the preceding figure except for their most significant digit. The label 400 has a single triangular locating hole which is positioned within a central, nondata-bearing region entirely surrounded by an annular data field 406. This triangular locating hole cooperates with a triangular locating pin 430 upon the reading device 410 so that the hole surfaces 436, 438 and 440 cooperate with the pin surfaces 444, 446 and 448 to establish both the linear and angular positions of the rotary scanner 416 relative to the data field 406.

The rotary scanner 416 is annular in shape, and again includes a radial line of elements 417 aligned with a starting position 424. The scanner operates through an annular window 418 which is bounded outwardly by a surface 414.1 and inwardly by a surface 414.2 of the reading device 410. The scanner is recessed from these surfaces by the width of an outer shoulder 420.1 and an inner shoulder 420.2 respectively. The centrally located prong 430 is mounted upon the central island surface 414.2 surrounded by the annular scanner 416.

Figure 5:
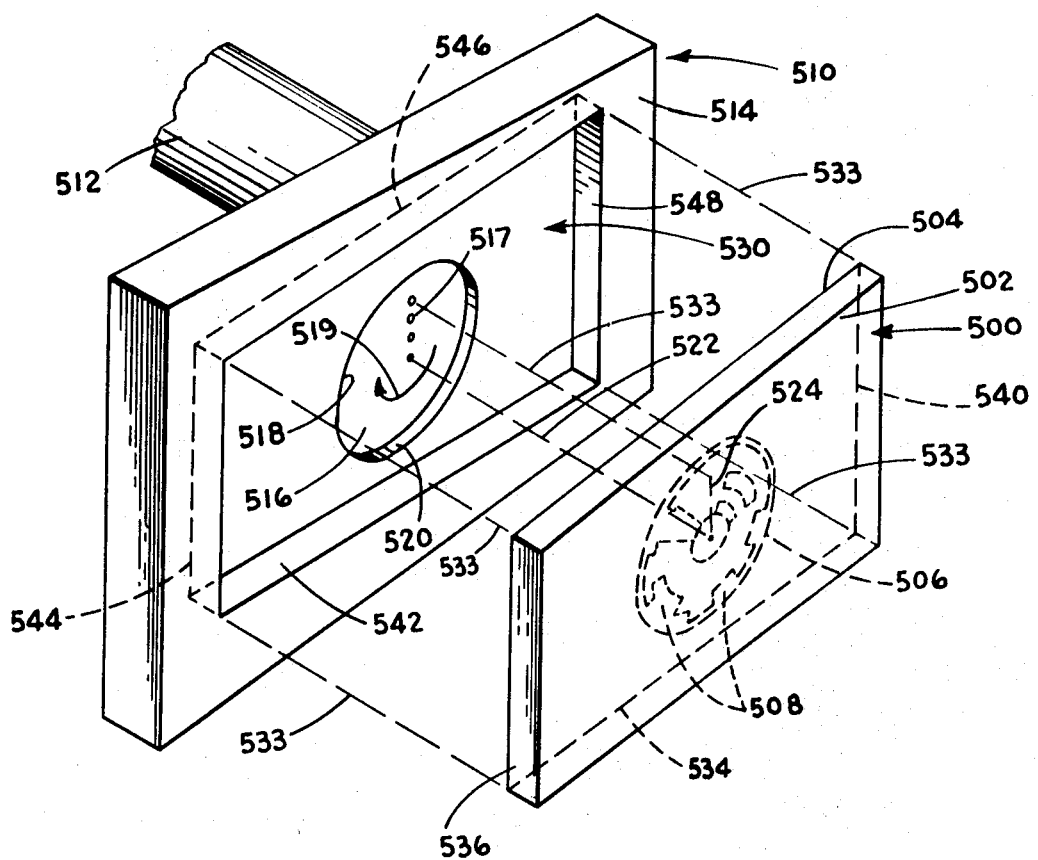
FIG. 5 is a still further alternative embodiment of an information-bearing label and cooperating reading device in accordance with this invention.

Finally, the alternate embodiment of FIG. 5 is basically similar to the preceding embodiments, the similarity being reflected by the use of reference numerals which match those of the preceding figures except for the most significant digit. The label 500 has no locating openings at all, but instead is formed with a quadrilateral shape and employs its four peripheral edges 534, 536, 538 and 540 as planar locating surfaces. The reading device 510 is formed with a socket 530 which is recessed below the front face 514 thereof, and the socket is congruently shaped and bounded by four mating locating surfaces 542, 544, 546 and 548 respectively. These mating locating surfaces on the label 500 and the reading device 510 are eccentric, and thus serve to establish both the linear position and angular orientation of the scanning head 516 relative to the data field 506. As a result, the center of the circular scanning head 516 is lined up in a rectangular coordinate sense with the axis of concentricity 522 of the circular data field 506, while the line of elements 517 is lined up in an angular sense with the starting position 524. In order to prevent reverse insertion of the label 500 into the socket 530, both may be made somewhat asymmetrical, e.g. trapezoidal, in shape.

In this embodiment the circular scanning head 516 operates through a circular window 518 formed in the rear wall of the locating socket 530, and the scanning head is recessed behind the rear surface of the socket by the width of a shoulder 520 which bounds the circular window 518.

It will now be appreciated that, as a general characteristic of the various embodiment of this invention, the use of a plurality of locating surfaces on the label mating with a corresponding plurality of locating surfaces on the reading device, where at least one of the pairs of mating locating surfaces is in eccentric relationship to the circular data field and rotating scanning head respectively, not only defines a position with respect to linear coordinates, but also defines a definite angular orientation of the scanning head so that each cycle of the head begins and ends at the starting position of the data field, resulting in a saving of device complexity and operating time.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A data system: comprising
 a label having a data field including a circular array of coded indicia;
 a first locating surface formed on said label;
 a second locating surface formed on said label;
 at least one of said surfaces being laterally offset from the center of said circular array of coded indicia and being oriented transversely of said data bearing surface thereof;
 a portable manually operable label reading device having a rotary scanning head that is adapted to be positioned concentrically with said data field in order to read said label indicia, said portable manually operable reading device being formed with first and second label locating surfaces, one of said surfaces being at least partially defined by a reader probe element;
 said first label surface being arranged to engage said first locating surface on said device in a manner to position said rotary scanning head relative to said data field with respect to at least one linear coordinate;
 said second label surface being arranged to engage said second locating surface on said device, said second locating surfaces thereby being arranged eccentrically relative to said data field and said scanning head respectively when said label is operatively coupled to said portable reading device thus attaining automatic rotary alignment between said scanning head and the circular data field on said label.

2. A system as in claim 1 wherein:
 said label has an outer edge enclosing said data-bearing surface, and said edge has substantially the shape of a polygon at least two sides of which are respective ones of said label locating surfaces;
 and said reading device is formed with a socket for receiving said label, said socket having an internal shape substantially defining a polygon which mates with the outer edge of said label, and at least two sides of which are respective ones of said devices locating surfaces.

3. A system as in claim 1 wherein:
 said label is formed with at least one substantially polygonally shaped internal opening, at least two sides of which are respective ones of said label locating surfaces;
 and said reading device is provided with a locating projection having substantially the external cross-sectional shape of a polygon which is adapted to mate with said opening, and at last two sides of which are respective ones of said device locating surfaces.

4. A system as in claim 3 wherein:
 said data field is substantially annular in shape, whereby to surround a central nondata-bearing region;
 and said polygonal label opening is located within said central nondata-bearing region.

5. A system as in claim 3 wherein:
 said polygons are substantially triangular in shape whereby any two of the three sides thereof are respective ones of said locating surfaces and are eccentric relative to said circular data field.

6. A system as in claim 3 wherein:
 said polygons are substantially rectangular in shape, whereby any two of the four sides thereof are respective ones of said locating surfaces and are eccentric relative to said circular data field.

7. A system as in claim 1 wherein:
 said label is formed with at least two internal openings the respective edges of which are respective ones of said label locating surfaces;
 and said reading device is provided with a pair of locating projections positioned and shaped to mate with respective ones of said label openings, the respective exterior surfaces of said projections being respective ones of said device locating surfaces.

8. A system as in claim 7 wherein:
at least one of said openings is located externally of said data field.

9. A system as in claim 8 wherein:
there are at least two of said label openings, both of which are substantially circular in shape.

10. A system as in claim 9 wherein:
both of said circular openings are located externally of said data field.

11. A system as in claim 8 wherein:
there are at least two of said label openings, both of which are substantially rectangular in shape.

12. A system as in claim 11 wherein:
both of said rectangular openings are oblong in shape, and are oriented with their respective major axes pointing in mutually transverse directions.

13. A system as in claim 11 wherein:
both of said rectangular openings are located externally of said data field.

14. A label having a data field including a circular array of coded indicia that is adapted to be sensed by a rotary scanning device; the improvement comprising:
a first aligning surface formed on said label;
a second aligning surface formed on said label;
at least one of said surfaces being laterally offset from the center of said circular array of coded indicia; said first and second aligning surfaces thus being adapted to fix the lateral and rotary position of said label relative to the effective scan axis of said rotary scanning device.

15. Apparatus as defined by claim 14 wherein said first and second aligning surfaces are effectively defined by a single continuous noncircular surface formed in said label.

16. Apparatus as defined by claim 15 wherein said noncircular surface is eccentrically disposed relative to the center of said circular array of coded indicia.

17. Apparatus as defined by claim 14 wherein said first and second aligning surfaces are effectively defined by two separate apertures formed in said label.

* * * * *